United States Patent
Boesel et al.

(10) Patent No.: US 12,524,969 B2
(45) Date of Patent: Jan. 13, 2026

(54) METHOD AND DEVICE FOR DYNAMIC DETERMINATION OF PRESENTATION AND TRANSITIONAL REGIONS

(71) Applicant: Apple Inc., Cupertino, CA (US)

(72) Inventors: Benjamin H. Boesel, Sunnyvale, CA (US); David H. Huang, San Mateo, CA (US); Jonathan Perron, Felton, CA (US); Shih-Sang Chiu, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 18/123,478

(22) Filed: Mar. 20, 2023

(65) Prior Publication Data

US 2024/0112419 A1  Apr. 4, 2024

Related U.S. Application Data

(63) Continuation of application No. PCT/US2021/043293, filed on Jul. 27, 2021.
(Continued)

(51) Int. Cl.
| | |
|---|---|
| *G06T 19/00* | (2011.01) |
| *G06F 3/01* | (2006.01) |
| *G06F 3/0482* | (2013.01) |
| *G06F 3/16* | (2006.01) |
| *G06T 13/00* | (2011.01) |

(52) U.S. Cl.
CPC ............ *G06T 19/006* (2013.01); *G06F 3/017* (2013.01); *G06F 3/0482* (2013.01); *G06F 3/167* (2013.01); *G06T 13/00* (2013.01)

(58) Field of Classification Search
None
See application file for complete search history.

(56) References Cited

U.S. PATENT DOCUMENTS

| | | |
|---|---|---|
| 2015/0254905 A1 | 9/2015 | Ramsby et al. |
| 2015/0302869 A1 | 10/2015 | Tomlin et al. |
| (Continued) | | |

OTHER PUBLICATIONS

Silva et al., "Reducing the Schizophrenia Stigma: A New Approach Based on Augmented Reality", 2017. (Year: 2017).*
(Continued)

*Primary Examiner* — Nicholas R Wilson
(74) *Attorney, Agent, or Firm* — Fernando & Partners, LLP

(57) ABSTRACT

In one implementation, a method for dynamically determining presentation and transitional regions for content delivery. The method includes obtaining a first set of characteristics associated with a physical environment; and detecting a request to cause presentation of virtual content. In response to detecting the request, the method also includes obtaining a second set of characteristics associated with the virtual content; generating a presentation region for the virtual content based at least in part on the first and second sets of characteristics; and generating a transitional region provided to at least partially surround the presentation region based at least in part on the first and second sets of characteristics. The method further includes concurrently presenting the virtual content within the presentation region and the transitional region at least partially surrounding the presentation region.

25 Claims, 12 Drawing Sheets

Related U.S. Application Data

(60) Provisional application No. 63/080,923, filed on Sep. 21, 2020.

(56) References Cited

U.S. PATENT DOCUMENTS

| | | |
|---|---|---|
| 2015/0310657 A1 | 10/2015 | Eden |
| 2016/0210783 A1 | 7/2016 | Tomlin et al. |
| 2018/0160123 A1* | 6/2018 | Van Der Auwera .......................... H04N 19/167 |
| 2019/0107721 A1 | 4/2019 | Scott et al. |
| 2019/0204910 A1 | 7/2019 | Held et al. |
| 2020/0278742 A1* | 9/2020 | Rajan ...................... G06F 3/167 |

OTHER PUBLICATIONS

PCT International Search Report and Written Opinion dated Nov. 10, 2021, PCT International Application No. PCT/US21/43293, pp. 1-12.

* cited by examiner

METHOD AND DEVICE FOR DYNAMIC DETERMINATION OF PRESENTATION AND TRANSITIONAL REGIONS

CROSS-REFERENCE TO RELATED APPLICATIONS

This application is a continuation of Intl. Patent App. No. PCT/US2021/043293, filed on Jul. 27, 2021, which claims priority to U.S. Provisional Patent App. No. 63/080,923, filed on Sep. 21, 2020, which are hereby incorporated by reference in their entireties.

TECHNICAL FIELD

The present disclosure generally relates to content delivery and, in particular, to systems, methods, and methods for dynamically determining presentation and transitional regions for content delivery.

BACKGROUND

In some instances, it may be difficult to present extended reality (XR) content at the proper proportions due to a lack of view distance while in tight quarters such as an airplane or an automobile. However, simply overlaying the XR content in a "portal" that allows for an artificially greater view distance may be jarring to the user due to visual discontinuities therebetween.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
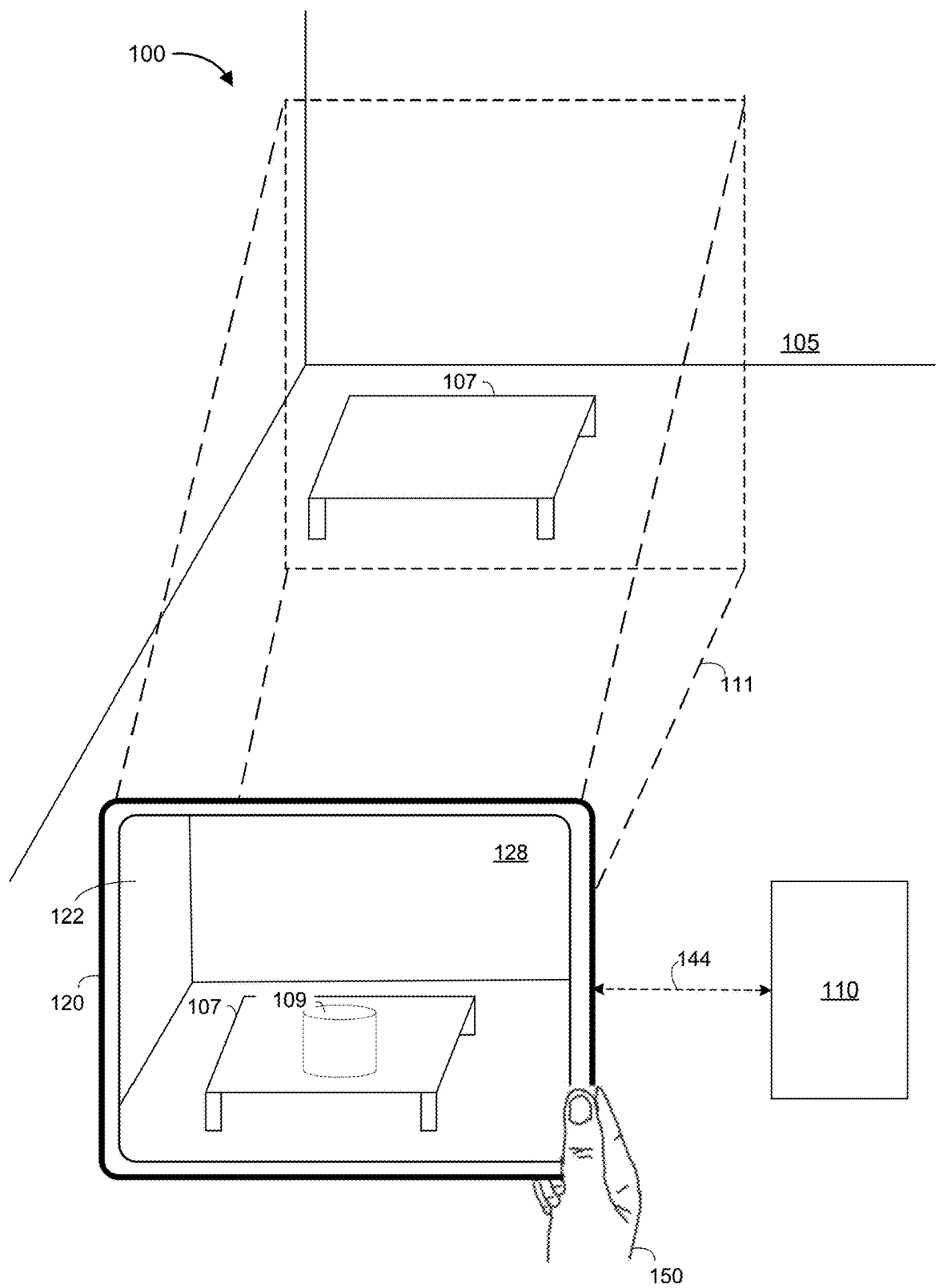
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for dynamically determining presentation and transitional regions for content delivery. According to some implementations, the method is performed at a computing system including non-transitory memory and one or more processors, wherein the computing system is communicatively coupled to a display device and one or more input devices. The method includes obtaining a first set of characteristics associated with a physical environment; and detecting, via the one or more input devices, a request to cause presentation of virtual content (sometimes also referred to herein as "XR content" or "graphical content"). In response to detecting the request, the method also includes obtaining a second set of characteristics associated with the virtual content; generating a presentation region for the virtual content based at least in part on the first and second sets of characteristics; and generating a transitional region provided to at least partially surround the presentation region based at least in part on the first and second sets of characteristics. The method further includes concurrently presenting, via the display device, the virtual content within the presentation region and the transitional region at least partially surrounding the presentation region.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as µLEDs, OLEDs, LEDs, liquid crystal on silicon, laser scanning light source, digital light projection, or combinations thereof An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120. For example, the electronic device 120 corresponds to a mobile phone, tablet, laptop, wearable computing device, or the like.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (sometimes also referred to herein as "graphical content" or "virtual content"), including the XR cylinder 109, onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
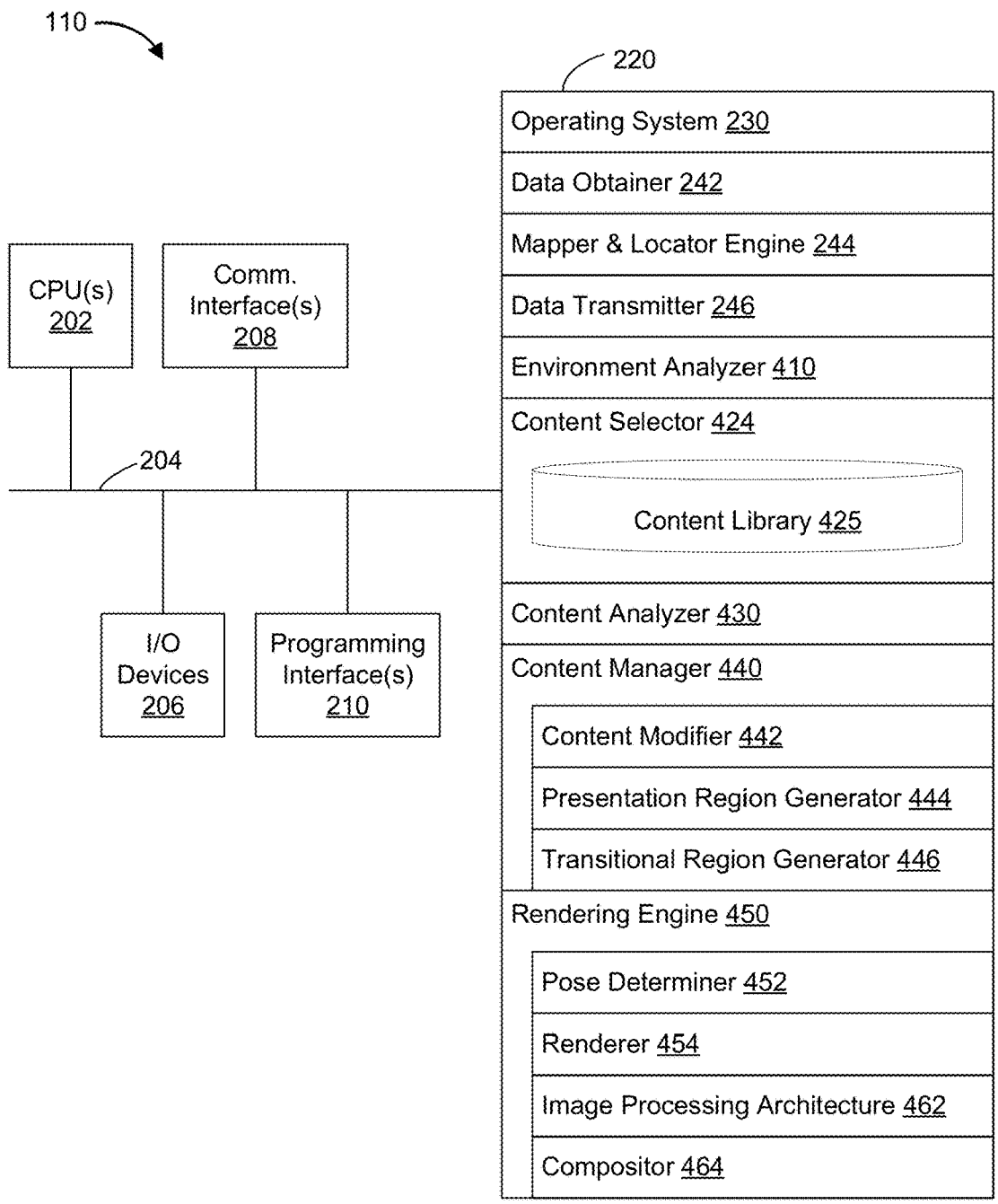
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, the data obtainer 242 is configured to obtain data (e.g., captured image frames of the physical environment 105, presentation data, input data, user interaction data, camera pose tracking information, eye tracking information, head/body pose tracking information, hand/limb tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, the data transmitter 246 is configured to transmit data (e.g., presentation data such as rendered image frames associated with the XR environment, location data, etc.) to at least the electronic device 120. To that end, in various implementations, the data transmitter 246 includes instructions and/or logic therefor, and heuristics and metadata therefor.

In some implementations, an environment analyzer 410 is configured to obtain (e.g., receive, retrieve, or generate) a first set of characteristics associated with the physical environment 105. For example, the first set of characteristics characterize various properties associated with the physical environment 105 such as dimensions, current lighting characteristics, current audio characteristics, acoustic characteristics, and/or the like of the physical environment 105. The environment analyzer 410 is described in more detail below with reference to FIG. 4A. The first set of characteristics 411 is described in more detail below with reference to FIG. 4B. To that end, in various implementations, the environment analyzer 410 includes instructions and/or logic therefor, and heuristics and metadata therefor.

In some implementations, a content selector 424 is configured to select XR content (sometimes also referred to herein as "graphical content" or "virtual content") from a content library 425 based on one or more user requests and/or inputs (e.g., a voice command, a selection from a user interface (UI) menu of XR content items, and/or the like). The content selector 424 is described in more detail below with reference to FIG. 4A. To that end, in various implementations, the content selector 424 includes instructions and/or logic therefor, and heuristics and metadata therefor.

In some implementations, the content library 425 includes a plurality of content items such as audio/visual (A/V) content and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

In some implementations, a content analyzer 430 is configured to obtain (e.g., receive, retrieve, or generate) a second set of characteristics associated with the XR content selected by the content selector 424. For example, the second set of characteristics characterize various properties associated with the XR content such as content type/characteristics, content dimensions, suitable viewing distance, focal/vanishing point, lighting characteristics for the XR content, audio characteristics for the XR content, mood for the XR content, and/or the like for the XR content as a whole or each theatrical scene therein. The content analyzer 430 is described in more detail below with reference to FIG. 4A. The second set of characteristics 413 is described in more detail below with reference to FIG. 4B. To that end, in various implementations, the content analyzer 430 includes instructions and/or logic therefor, and heuristics and metadata therefor.

In some implementations, a content manager 440 is configured to manage the layout, setup, structure, and/or the like for the XR content selected by the content selector 424 based on the first and second sets of characteristics. The content manager 440 is described in more detail below with reference to FIG. 4A. To that end, in various implementations, the content manager 440 includes instructions and/or logic therefor, and heuristics and metadata therefor. In some implementations, the content manager 440 includes a content modifier 442, a presentation region generator 444, and a transitional region generator 446.

In some implementations, the content modifier 442 is configured to modify the XR content selected by the content selector 424 based at least in part on the first and second sets of characteristics. As one example, the content modifier 442 may change a color, a texture, a brightness, contrast, one or more dimensions, and/or the like of the XR content (or portions thereof) selected by the content selector 424. As another example, the content modifier 442 may change lighting characteristics, shadows, audio characteristics, and/or the like of the XR content selected by the content selector 424. As another example, the content modifier 442 may add XR content portions to or remove XR content portions of the XR content selected by the content selector 424. The content modifier 442 is described in more detail below with reference to FIG. 4A. To that end, in various implementations, the content modifier 442 includes instructions and/or logic therefor, and heuristics and metadata therefor.

In some implementations, the presentation region generator 444 is configured to generate a presentation region for the XR content based at least in part on the first and second sets of characteristics. The presentation region generator 444 is described in more detail below with reference to FIG. 4A and FIGS. 5A-5E. To that end, in various implementations, the presentation region generator 444 includes instructions and/or logic therefor, and heuristics and metadata therefor.

In some implementations, the transitional region generator 446 is configured to generate a transitional region provided to surround the presentation region based at least in part on the first and second sets of characteristics. The transitional region generator 446 is described in more detail below with reference to FIG. 4A and FIGS. 5A-5E. For example, the transitional region reduces discontinuities between the presentation region and the physical environment (e.g., visual discontinuities associated with different colors, brightness, contrast, etc. between the presentation region and the physical environment, depth discontinuities between the presentation region and the physical environment, and/or other differences between the presentation region and the physical environment that may be jarring to a user). To that end, in various implementations, the transitional region generator 446 includes instructions and/or logic therefor, and heuristics and metadata therefor.

In some implementations, a rendering engine 450 is configured to render a XR environment (sometimes also referred to herein as a "graphical environment" or "virtual environment") or image frame associated therewith including the presentation region with the XR content therein as well as the transitional region surrounding the presentation region. To that end, in various implementations, the rendering engine 450 includes instructions and/or logic therefor, and heuristics and metadata therefor. In some implementations, the rendering engine 450 includes a pose determiner 452, a renderer 454, an image processing architecture 462, and a compositor 464.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the environment analyzer 410, the content selector 424, the content analyzer 430, the content manager 440, and the rendering engine 450 are shown as residing on a single device (e.g., the controller 110), it should be understood that in other implementations, any combination of data obtainer 242, the mapper and locator engine 244, the data transmitter 246, the environment analyzer 410, the content selector 424, the content analyzer 430, the content manager 440, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
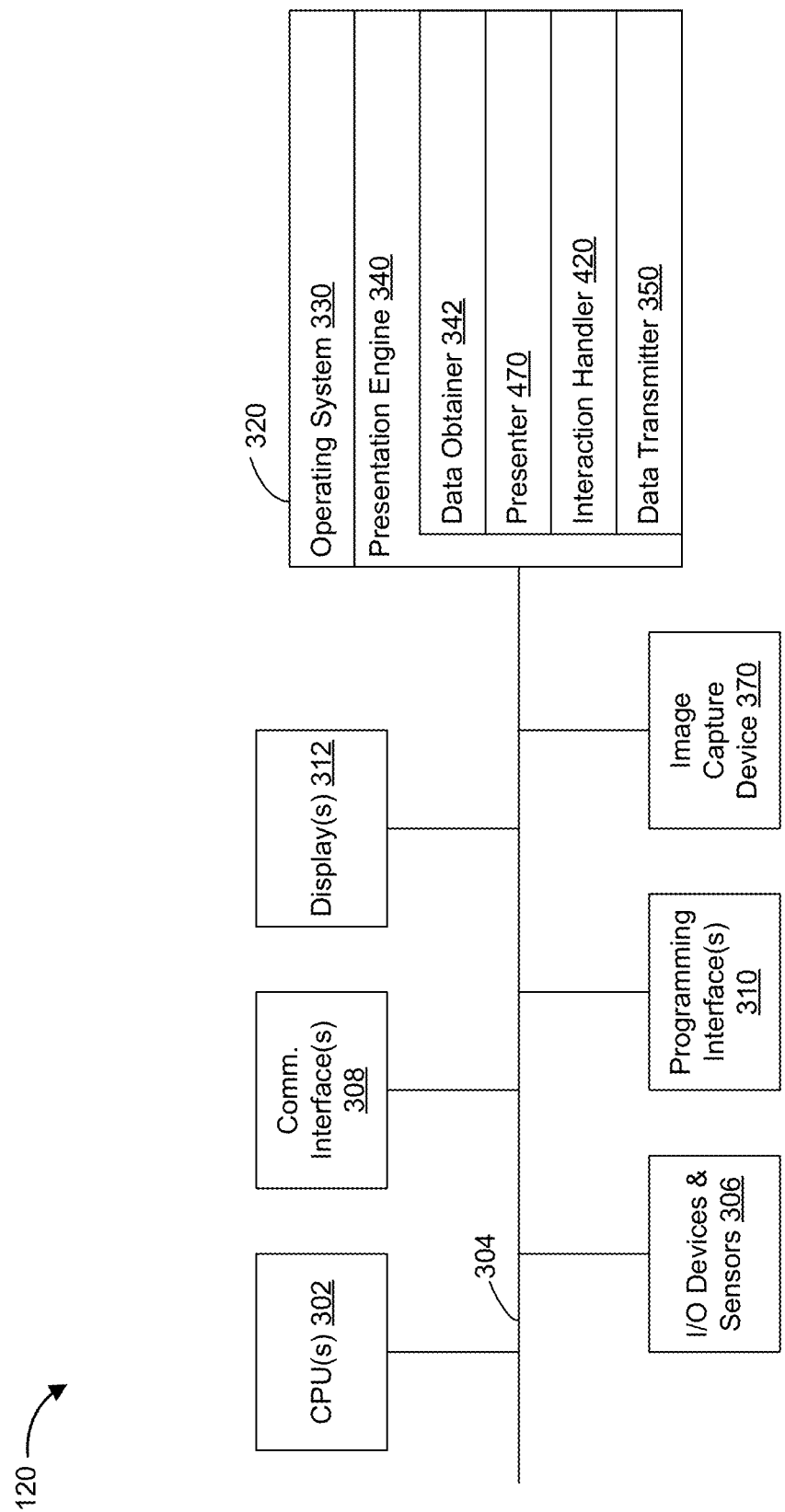
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 470 is configured to present and update A/V content and/or XR content (e.g., the rendered image frames associated with the user interface or the XR environment) via the one or more displays 312. To that end, in various implementations, the presenter 470 includes instructions and/or logic therefor, and heuristics and metadata therefor.

In some implementations, the interaction handler 420 is configured to detect user interactions with the presented A/V content and/or XR content (e.g., gestural inputs detected via hand tracking, eye gaze inputs detected via eye tracking, voice commands, etc.). To that end, in various implementations, the interaction handler 420 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 470, the interaction handler 420, and the data transmitter 350 are shown as residing on a single device (e.g., the electronic device 120), it should be understood that in other implementations, any combination of the data obtainer 342, the presenter 470, the interaction handler 420, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
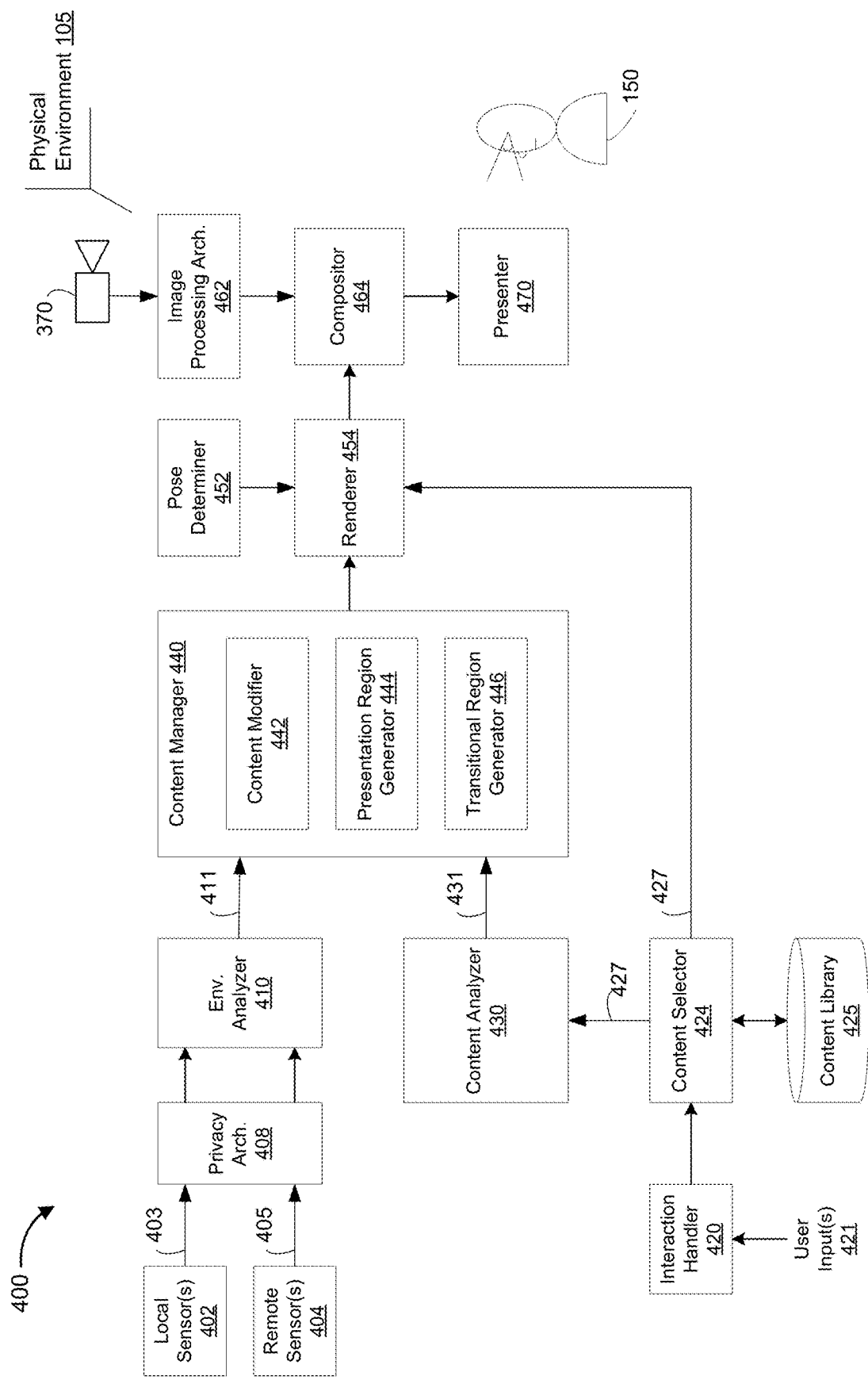
FIG. 4A is a block diagram of an example content delivery architecture in accordance with some implementations.

FIG. 4A is a block diagram of an example content delivery architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 400 is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 include simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like.

Similarly, as shown in FIG. 4A, one or more remote sensors 404 associated with the optional remote input devices within the physical environment 105 obtain remote sensor data 405 associated with the physical environment 105. For example, the remote sensor data 405 include SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits content delivery architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the environment analyzer 410 obtains the local sensor data 403 and the remote sensor data 405 after it has been subjected to the privacy architecture 408. In some implementations, the environment analyzer 410 obtains (e.g., receives, retrieves, or generates) a first set of characteristics 411 associated with the physical environment 105 based on the local sensor data 403 and the remote sensor data 405. For example, the first set of characteristics 411 characterize various properties associated with the physical environment 105 such as dimensions, current lighting characteristics, current audio characteristics, acoustic characteristics, and/or the like of the physical environment 105.

Figure 4B:
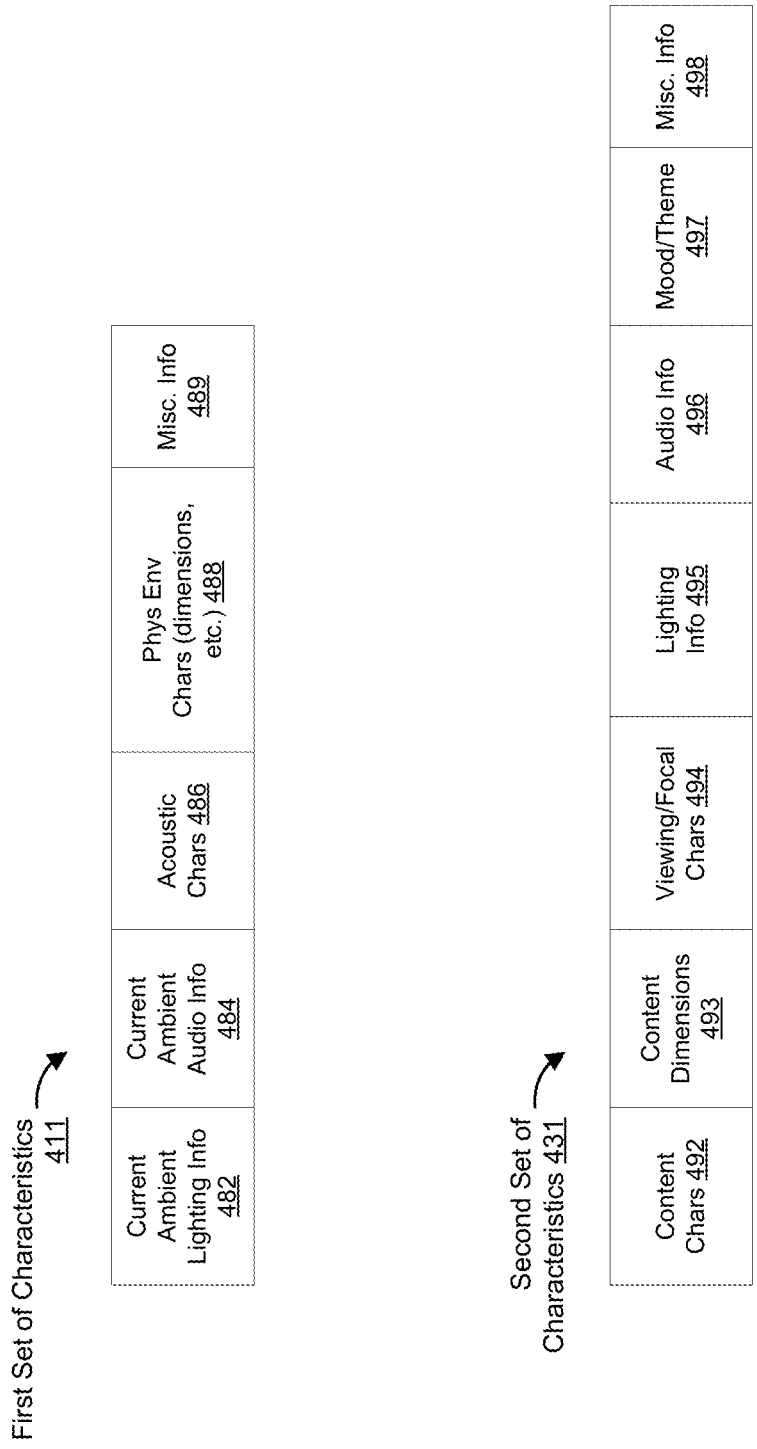
FIG. 4B illustrates example data structures for first and second sets of characteristics in accordance with some implementations.

FIG. 4B shows an example data structure for the first set of characteristics 411 associated with the physical environment 105. As shown in FIG. 4B, the first set of characteristics 411 may correspond to an N-tuple characterization vector or characterization tensor that includes current ambient lighting information 482 associated with the physical environment 105, current ambient audio information 484 associated with the physical environment 105, acoustic characteristics 486 associated with the physical environment 105, physical environment characteristics 488 (e.g., dimensions, semantically labeled objects therein, and/or the like) associated with the physical environment 105, and/or miscellaneous information 489 associated with the physical environment 105. One of ordinary skill in the art will appreciate that the data structure for the first set of characteristics 411 in FIG. 4B is merely an example that make include different information portions in various other implementations and be structured in myriad ways in various other implementations.

According to some implementations, the interaction handler 420 obtains (e.g., receives, retrieves, or detects) one or more user inputs 421 provided by the user 150 that are associated with selecting A/V content and/or XR content for presentation. For example, the one or more user inputs 421 correspond to a gestural input selecting XR content from a UI menu detected via hand tracking, an eye gaze input selecting XR content from the UI menu detected via eye tracking, a voice command selecting XR content from the UI menu detected via a microphone, and/or the like.

In some implementations, the content selector 424 selects XR content 427 from the content library 425 based on one or more user inputs 421 (e.g., a voice command, a selection from a menu of XR content items, and/or the like).

In some implementations, the content analyzer 430 obtains (e.g., receives, retrieves, or generates) a second set of characteristics 431 associated with the XR content 427. For example, the second set of characteristics 431 characterize various properties associated with the XR content 427 such as content type/characteristics for the XR content 427, content dimensions for the XR content 427, a suitable viewing distance for the XR content 427, a focal/vanishing point for the XR content 427, lighting characteristics for the XR content 427, audio characteristics for the XR content 427, mood for the XR content 427, and/or the like for the XR content 427 as a whole or each theatrical scene therein.

FIG. 4B shows an example data structure for the second set of characteristics 431 associated with the XR content 427. As shown in FIG. 4B, the second set of characteristics 431 may correspond to an M-tuple characterization vector or characterization tensor that includes content labels/characteristics 492 for the XR content 427, content dimensions 493 for the XR content 427, viewing/focal characteristics 494 for the XR content 427, lighting information 495 for the XR content 427, audio information 496 for the XR content 427, a mood/theme 497 for the XR content 427, and/or miscellaneous information 498 for the XR content 427. One of ordinary skill in the art will appreciate that the data structure for the second set of characteristics 431 in FIG. 4B is merely an example that make include different information portions in various other implementations and be structured in myriad ways in various other implementations.

In various implementations, the content manager 440 manages the layout, setup, structure, and/or the like for the XR content 427 based on the first and second sets of characteristics. In some implementations, the content modifier 442 modifies the XR content based at least in part on the first and second sets of characteristics. As one example, the content modifier 442 may change a color, a texture, a brightness, contrast, one or more dimensions, and/or the like of the XR content 427. As another example, the content modifier 442 may change lighting characteristics, shadows, audio characteristics, and/or the like of the XR content 427. As another example, the content modifier 442 may add XR content portions to or remove XR content portions of the XR content 427.

In some implementations, the presentation region generator 444 generates a presentation region for the XR content based at least in part on the first and second sets of characteristics. For example, see the sequence of instances illustrated in FIGS. 5A-5E and the description thereof below for further detail regarding the presentation regions 532 and 542.

In some implementations, the transitional region generator 446 generates a transitional region provided to surround the presentation region based at least in part on the first and second sets of characteristics. For example, see the sequence of instances illustrated in FIGS. 5A-5E and the description thereof below for further detail regarding the transitional regions 536 and 548.

According to some implementations, the pose determiner 452 determines a current camera pose of the electronic device 120 and/or the user 150 relative to the XR content 427 and/or the physical environment 105. In some implementations, the renderer 454 renders the XR content 427 within the presentation region generated by the presentation region generator 444 according to the current camera pose relative thereto, which, in turn, is surrounded by the transitional region generated by the transitional region generator 446.

According to some implementations, the image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the compositor 464 composites the rendered XR content with the processed image stream of the physical environment 105 from the image processing architecture 462 to produce rendered image frames of the XR environment. In various implementations, the presenter 470 presents the rendered image frames of the XR environment to the user 150 (e.g., via the one or more displays 312 of the electronic device 120).

FIGS. 5A-5E illustrate a sequence of instances 510, 520, 530, 540, and 550 for a dynamic content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 510, 520, 530, 540, and 550 are rendered and presented by a computing system such as the controller 110 shown in FIGS. 1 and 2; the electronic device 120 shown in FIGS. 1 and 3; and/or a suitable combination thereof.

As shown in FIGS. 5A-5E, the dynamic content delivery scenario includes a physical environment 105 and an XR environment 128 displayed on the display 122 of the electronic device 120. The electronic device 120 presents the XR environment 128 to the user 150 while the user 150 is physically present within the physical environment 105 that includes a door 115, which is not currently within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122. For example, the electronic device 120 corresponds to a mobile phone, tablet, laptop, near-eye system, wearable computing device, or the like.

Figure 5A:
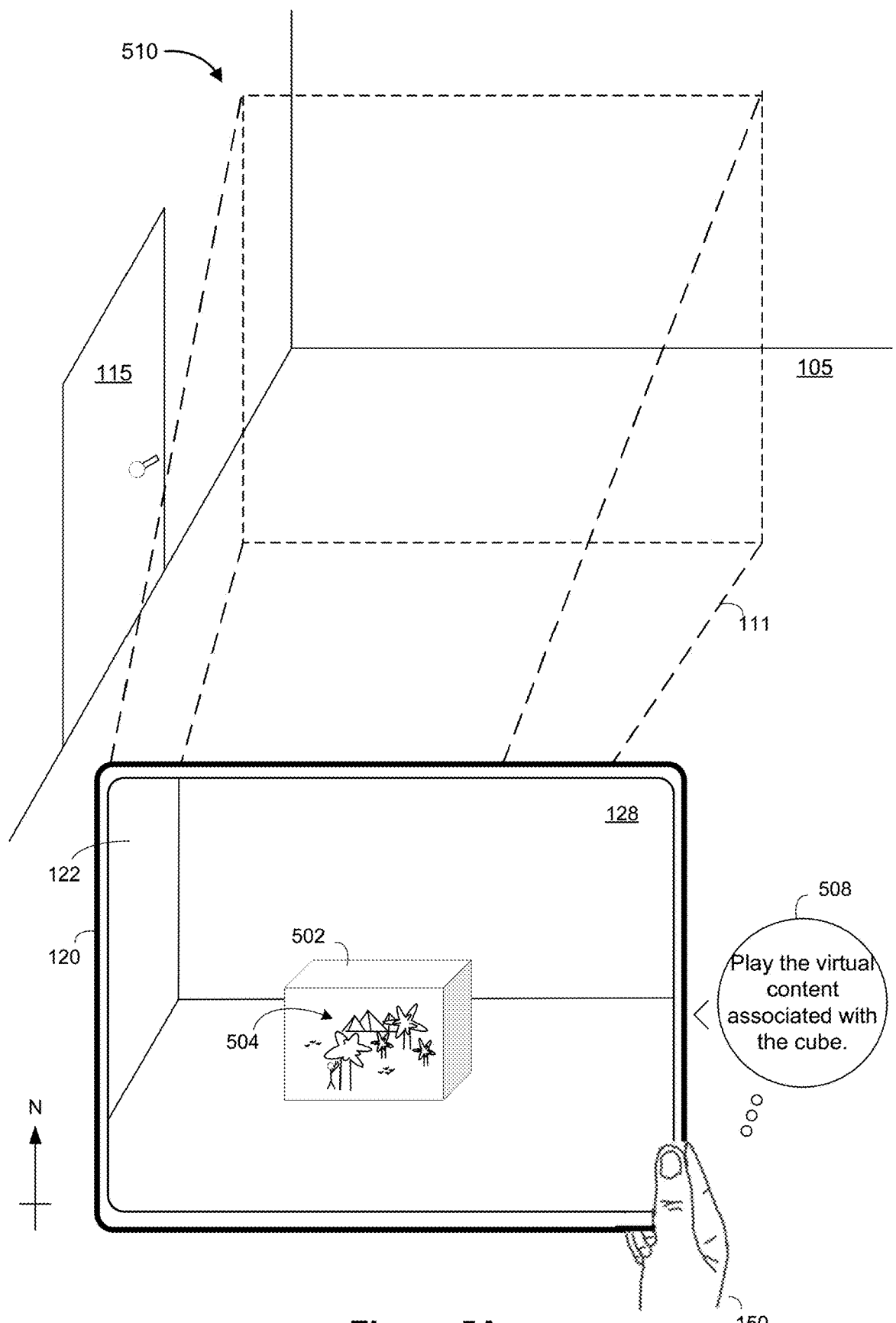
FIGS. 5A-5E illustrate a sequence of instances for a dynamic content delivery scenario in accordance with some implementations.

As shown in FIG. 5A, during the instance 510 (e.g., associated with time $T_1$) of the dynamic content delivery scenario, the electronic device 120 presents an XR environment 128 including a selectable XR cube 502 that is associated with XR content 504. In FIG. 5A, the selectable XR cube 502 is overlaid on the representation of the physical environment 105 (e.g., pass-through video or optical see-through associated with the physical environment 105) within the XR environment 128. As one example, the XR content 504 corresponds to a 3D reconstruction of a video or memory captured by the user 150. As another example, the XR content 504 corresponds to a movie, TV episode, play, and/or the like. As shown in FIG. 5A, the FOV 111 of the exterior-facing image sensor of the electronic device 120 faces northward within the physical environment 105.

In FIG. 5A, the electronic device 120 detects a voice command 508 (e.g., "Play the virtual content associated with the cube.") from the user 150. In response to detecting the voice command 508 in FIG. 5A, the electronic device 120 phases the XR content 504 into the XR environment 128 in FIGS. 5B and 5C.

Figure 5B:
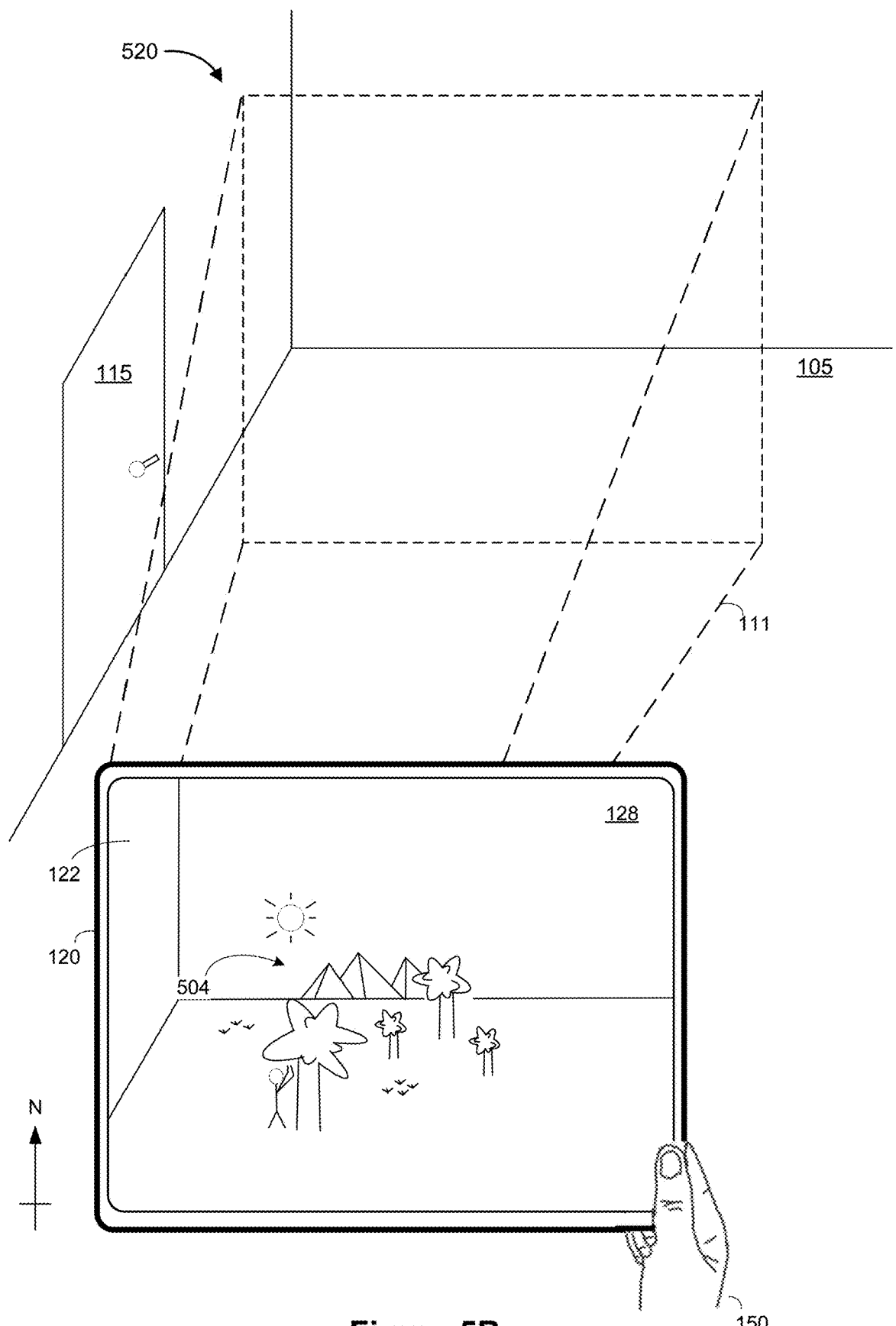

As shown in FIG. 5B, during the instance 520 (e.g., associated with time $T_2$) of the dynamic content delivery scenario, the electronic device 120 presents the XR content 504 overlaid on the representation of the physical environment 105 within the XR environment 128. In some implementations, the electronic device 120 only presents the foreground portions of the XR content 504 overlaid on the representation of the physical environment 105 within the XR environment 128.

Figure 5C:
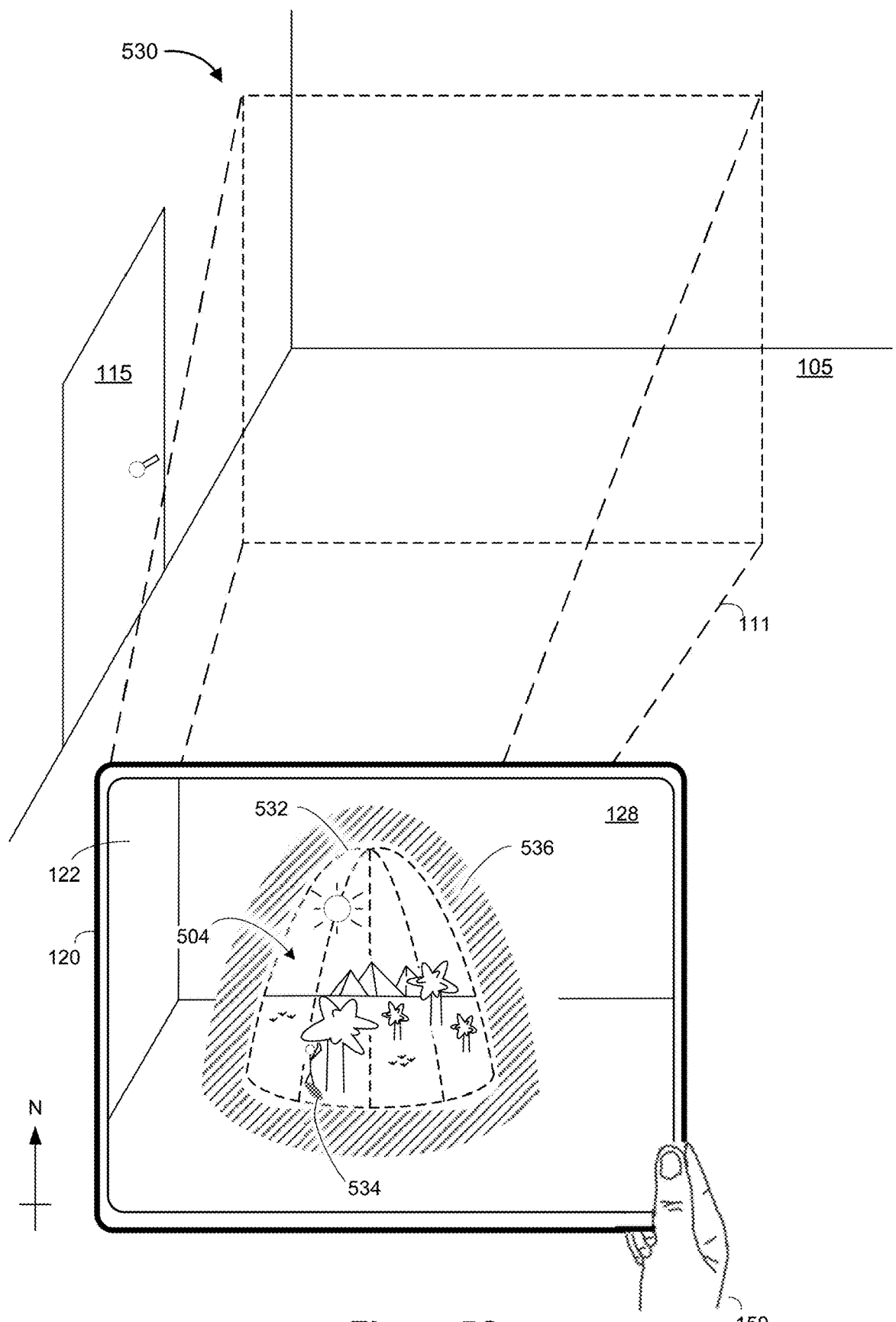

As shown in FIG. 5C, during the instance 530 (e.g., associated with time $T_3$) of the dynamic content delivery scenario, the electronic device 120 presents the XR content 504 within a presentation region 532, which is overlaid on the representation of the physical environment 105 within the XR environment 128. As one example, the presentation region 532 acts as a portal relative to the representation of the physical environment 105 and cuts away a portion of the representation of the physical environment 105. In some implementations, the size, shape, and/or the like of the presentation region 532 is determined based at least in part on a first set of characteristics associated with the physical environment 105 and a second set of characteristics associated with the XR content 504. In FIG. 5C, a shadow 534 is added to the XR content 504 based on a direction of the Sun or another light source within the XR content 504.

As shown in FIG. 5C, during the instance 530 of the dynamic content delivery scenario, the electronic device 120 also presents a transitional region 536 surrounding the presentation region 532 within the XR environment 128. In some implementations, the size, shape, color, brightness, contrast, texture, content, and/or the like of the transitional region 536 is determined based at least in part on the first set of characteristics associated with the physical environment 105 and the second set of characteristics associated with the XR content 504. For example, the transitional region 536 visually blends the presentation region 532 with the representation of the physical environment 105 within the XR environment 128 in order to reduce visual discontinuities therebetween. In other words, the transitional region 536 reduces discontinuities between the presentation region 532 and the physical environment 105 such as visual discontinuities associated with different colors, brightness, contrast, etc. between the presentation region 532 and the physical environment 105, depth discontinuities between the presentation region 532 and the physical environment 105, and/or other differences between the presentation region 532 and the physical environment 105 that may be jarring to a user.

In some implementations, the transitional region 536 may not fully surround the presentation region 532 but cover the edges of the presentation region 532 (e.g., relative to the current pose of the electronic device and/or the user 150) in order to limit occlusion of the XR content 504 within the presentation region 532.

Figure 5D:
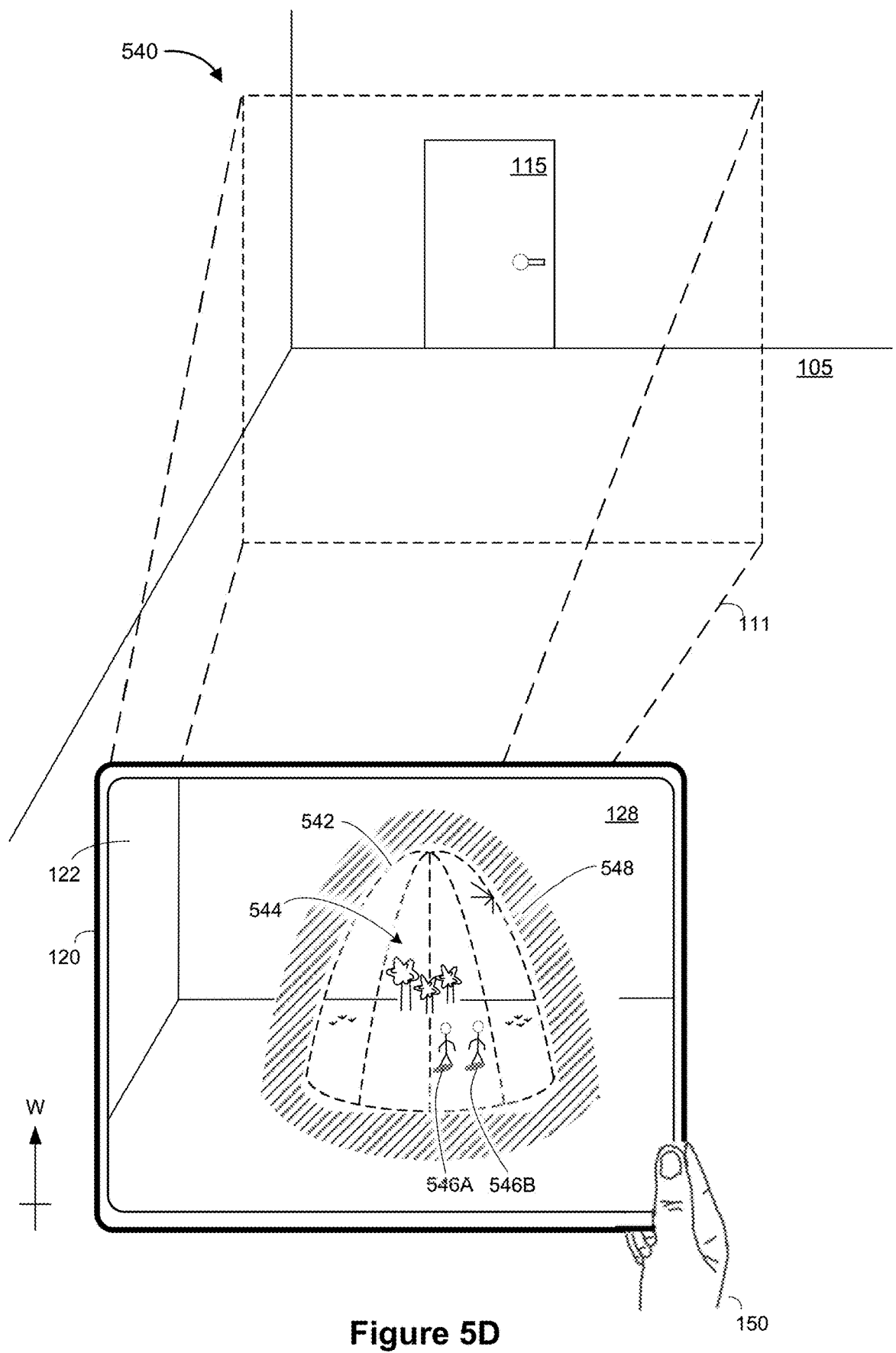

Between FIGS. 5C and 5D, the electronic device 120 detects a change in the camera pose whereby the FOV 111 of the exterior-facing image sensor of the electronic device 120 changes from facing northward relative to the physical environment 105 in FIG. 5C to facing westward relative to the physical environment 105 in FIG. 5D. In FIG. 5D, the door 115 is within the FOV 111 of the exterior-facing image sensor of the electronic device 120. In response to detecting the change in the camera pose between FIGS. 5C and 5D, the electronic device 120 leaves the XR content 504 (e.g., world-locked) in its location and presents second XR content 544 in FIG. 5D.

As shown in FIG. 5D, during the instance 540 (e.g., associated with time $T_4$) of the dynamic content delivery scenario, the electronic device 120 presents the second XR content 544 within a presentation region 542, which is overlaid on the representation of the physical environment 105 within the XR environment 128. In FIG. 5D, shadows 546A and 546B are added to the second XR content 544 based on a direction of the Sun or another light source within the second XR content 544. As shown in FIG. 5D, during the instance 540 of the dynamic content delivery scenario, the electronic device 120 also presents a transitional region 548 surrounding the presentation region 542 within the XR environment 128.

For example, the transitional region 548 reduces discontinuities between the presentation region 542 and the physical environment 105 such as visual discontinuities associated with different colors, brightness, contrast, etc. between the presentation region 542 and the physical environment 105, depth discontinuities between the presentation region 542 and the physical environment 105, and/or other differences between the presentation region 542 and the physical environment 105 that may be jarring to a user. In some implementations, the transitional region 548 may not fully surround the presentation region 542 but cover the edges of the presentation region 542 (e.g., relative to the current pose of the electronic device and/or the user 150) in order to limit occlusion of the XR content 544 within the presentation region 542.

Figure 5E:
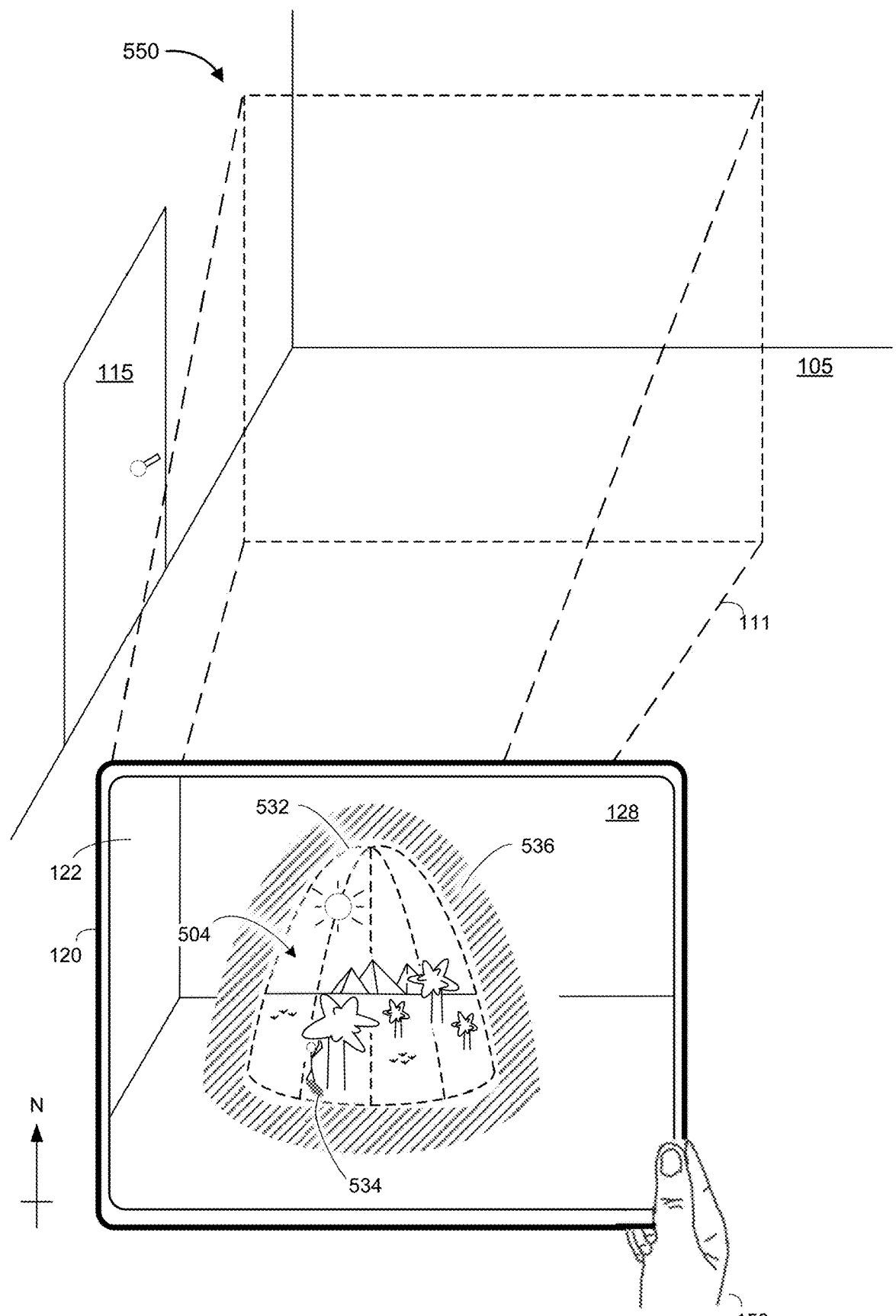

Between FIGS. 5D and 5E, the electronic device 120 detects a change in the camera pose whereby the FOV 111 of the exterior-facing image sensor of the electronic device 120 changes from facing westward relative to the physical environment 105 in FIG. 5D to facing northward relative to the physical environment 105 in FIG. 5E. In FIG. 5E, the door 115 is no longer within the FOV 111 of the exterior-facing image sensor of the electronic device 120. In response to detecting the change in the camera pose between FIGS. 5D and 5E, the electronic device 120 leaves the second XR content 544 (e.g., world-locked) in its location and presents the XR content 504 in FIG. 5E.

As shown in FIG. 5E, during the instance 550 (e.g., associated with time $T_5$) of the dynamic content delivery scenario, the electronic device 120 presents the XR content 504 within a presentation region 532 (e.g., similar to the instance 530 in FIG. 5C), which is overlaid on the representation of the physical environment 105 within the XR environment 128. In FIG. 5E, the shadow 534 is added to the XR content 504 based on the direction of the Sun or another light source within the XR content 504. As shown in FIG. 5E, during the instance 550 of the dynamic content delivery scenario, the electronic device 120 also presents the transitional region 536 surrounding the presentation region 532 within the XR environment 128 (e.g., similar to the instance 530 in FIG. 5C).

Figure 6:
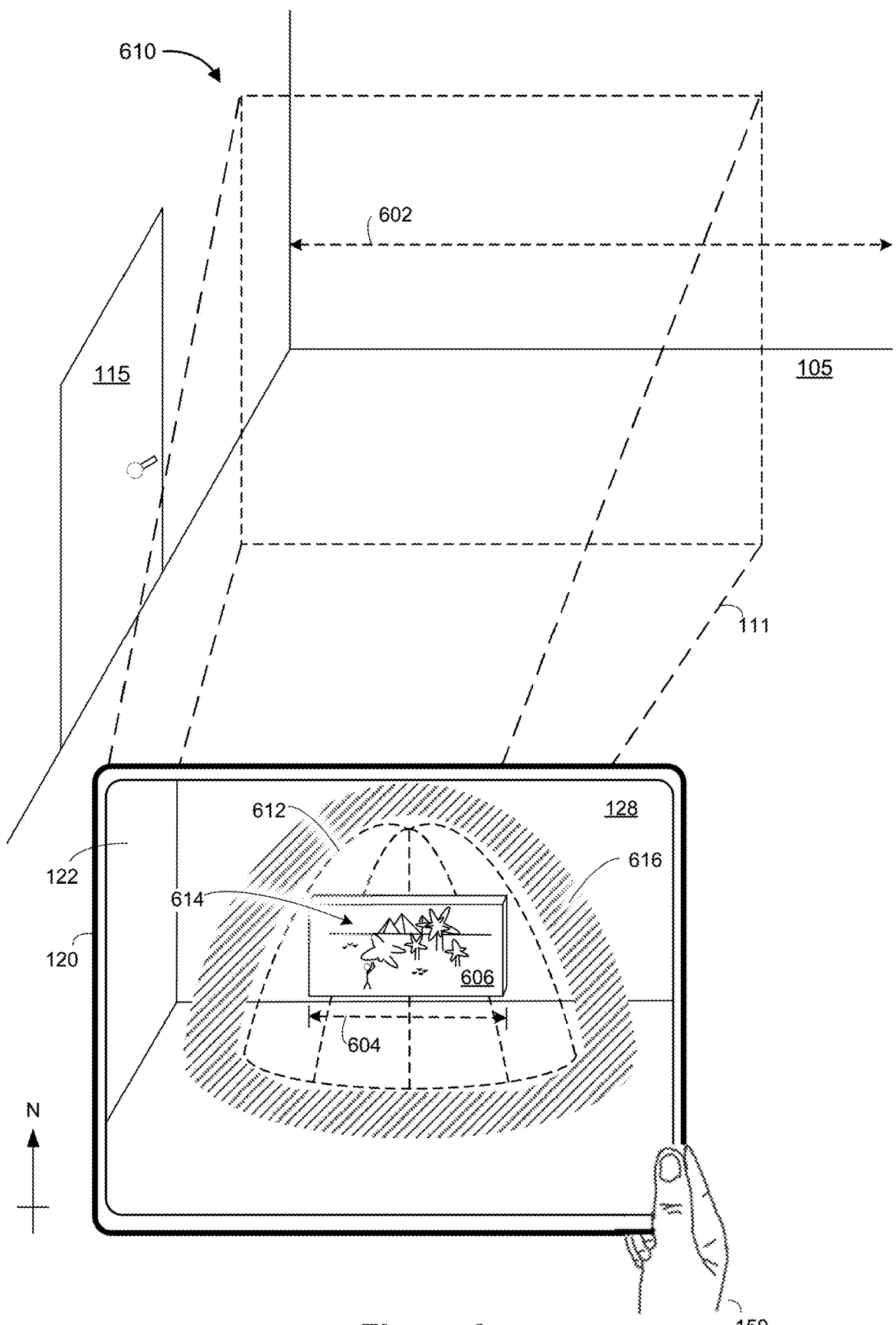
FIG. 6 illustrates an instance for another content delivery scenario in accordance with some implementations.

FIG. 6 illustrates an instance 610 for another content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the instance 610 is rendered and presented by a computing system such as the controller 110 shown in FIGS. 1 and 2; the electronic device 120 shown in FIGS. 1 and 3; and/or a suitable combination thereof.

As shown in FIG. 6, the dynamic content delivery scenario includes a physical environment 105 and an XR environment 128 displayed on the display 122 of the electronic device 120. The electronic device 120 presents the XR environment 128 to the user 150 while the user 150 is physically present within the physical environment 105 that includes a door 115, which is not currently within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122. For example, the electronic device 120 corresponds to a mobile phone, tablet, laptop, near-eye system, wearable computing device, or the like.

As shown in FIG. 6, during the instance 610 (e.g., associated with time $T_1$) of the dynamic content delivery scenario, the electronic device 120 presents an XR environment 128 including XR content 614 presented on a presentation surface 606 (e.g., a XR screen) within a presentation region 612, which is overlaid on the representation of the physical environment 105 (e.g., pass-through video or optical see-through associated with the physical environment 105) within the XR environment 128. As one example, the presentation region 612 acts as a portal relative to the representation of the physical environment 105 and cuts away a portion of the representation of the physical environment 105. In some implementations, the size, shape, and/or the like of the presentation region 612 is determined based at least in part on a first set of characteristics associated with the physical environment 105 and a second set of characteristics associated with the XR content 614 and/or the presentation surface 606.

As shown in FIG. 6, during the instance 610 of the dynamic content delivery scenario, the electronic device 120 also presents a transitional region 616 surrounding the presentation region 612 within the XR environment 128. In some implementations, the size, shape, color, brightness, contrast, texture, and/or the like of the transitional region 612 is determined based at least in part on the first set of characteristics associated with the physical environment 105 and the second set of characteristics associated with the XR content 614 and/or the presentation surface 606. For example, the transitional region 616 visually blends the presentation region 612 with the representation of the physical environment 105 within the XR environment 128 in order to reduce visual discontinuities therebetween.

For example, the transitional region 616 reduces discontinuities between the presentation region 612 and the physical environment 105 such as visual discontinuities associated with different colors, brightness, contrast, etc. between the presentation region 612 and the physical environment 105, depth discontinuities between the presentation region 612 and the physical environment 105, and/or other differences between the presentation region 612 and the physical environment 105 that may be jarring to a user. In some implementations, the transitional region 616 may not fully surround the presentation region 612 but cover the edges of the presentation region 612 (e.g., relative to the current pose of the electronic device and/or the user 150) in order to limit occlusion of the XR content 614 within the presentation region 612.

In FIG. 6, a north wall of the physical environment 105 is associated with a width value 602, and the presentation surface 606 is associated with a width value 604. In some implementations, the width value 604 is greater than the width value 602. As such, in one example, the presentation region 612 enables the user 150 to view the XR content 614 on the presentation surface 606 that is wider and/or larger than the physical dimensions of the physical environment 105. In other words, in some implementations, the presentation region 612 enables an artificially greater view distance and a greater presentation surface than is physically possible in the physical environment 105. As one example, this is particularly beneficial when view distance is limited while the user 150 is a passenger in an airplane, automobile, bus, or the like.

Figure 7:
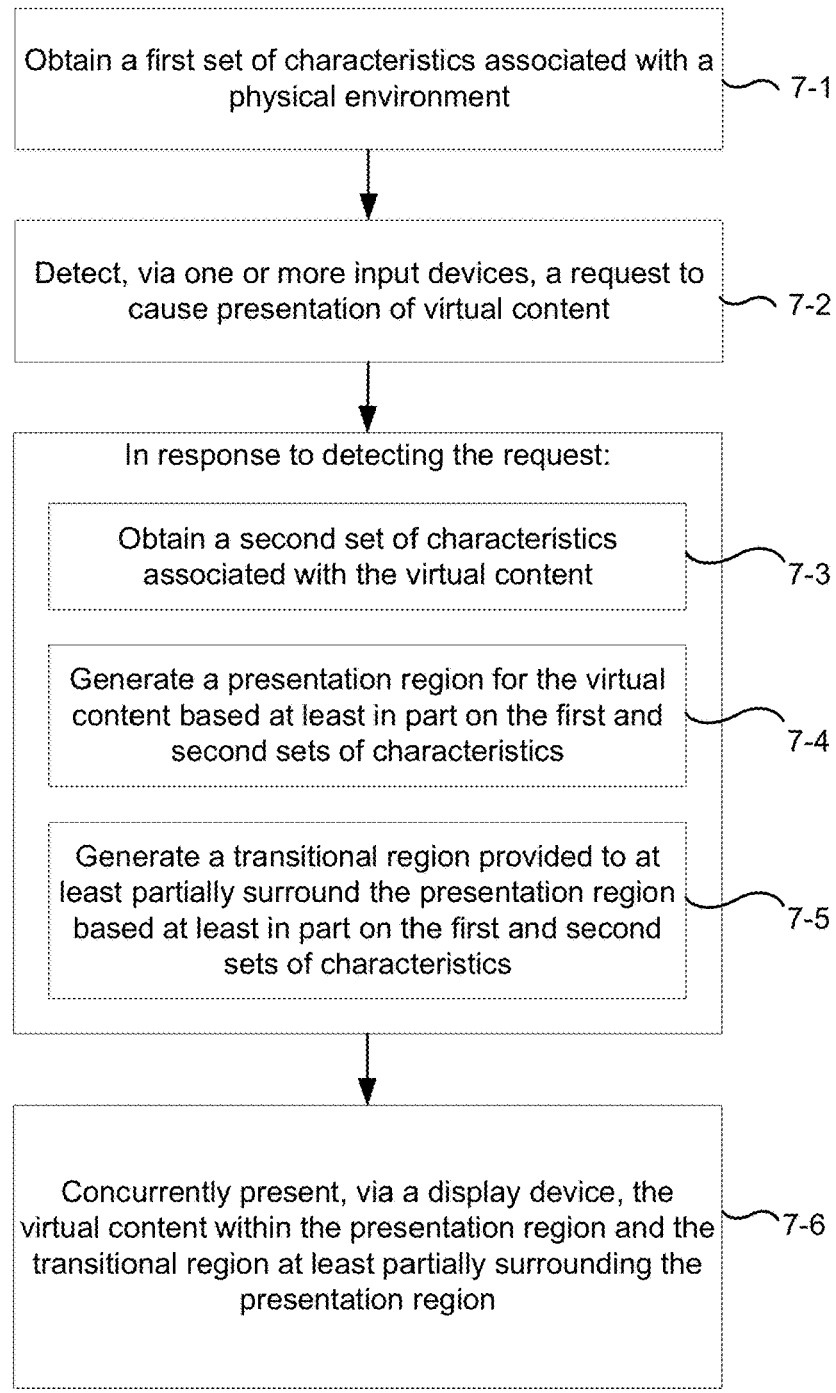
FIG. 7 is a flowchart representation of a method of dynamically determining presentation and transitional regions for content delivery in accordance with some implementations.

FIG. 7 is a flowchart representation of a method 700 of dynamically determining presentation and transitional regions for content delivery in accordance with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, in some instances, it may be difficult to present XR content at the proper proportions due to a lack of view distance while in tight quarters such as an airplane or an automobile. However, simply overlaying the XR content in a "portal" that allows for an artificially greater view distance may be jarring to the user due to visual discontinuities therebetween. As such, in various implementations, the computing system determines a presentation region based on characteristics of the physical environment and the XR content itself. In turn, the presentation region is overlaid on the physical environment and the XR content is presented therewithin in order to artificially increase the view distance and provide a more comfortable experience to a user. Additionally, the computing system also determines a transitional region based on characteristics of the physical environment and the XR content itself in order to blend the presentation region more naturally into the physical environment. This helps to alleviate visual discontinuities between the presentation region and the physical environment. In other words, when view distance is limited (e.g., airplane or automobile passengers), the computing system dynamically determines both a presentation region within which to present XR content at an appropriate view distance that "cuts-away" the physical environment and a transitional region that blends into the physical environment based on characteristics of the physical environment and the XR content itself.

As represented by block 7-1, the method 700 includes obtaining a first set of characteristics associated with a physical environment. In some implementations, the computing system or a component thereof (e.g., the environment analyzer 410 in FIGS. 2 and 4A) obtains (e.g., receives, retrieves, or generates) the first set of characteristics associated with the physical environment. In some implementations, the first set of characteristics include at least one of one or more dimensions of the physical environment, current lighting characteristics associated with the physical environment, current audio characteristics associated with the physical environment, acoustic characteristics associated with the physical environment, or the like. FIG. 4B, for example, shows an example data structure for the first set of characteristics 411 associated with the physical environment 105.

As represented by block 7-2, the method 700 includes detecting, via the one or more input devices, a request to cause presentation of virtual content (sometimes also herein referred to as "XR content"). In some implementations, the computing system or a component thereof (e.g., the interaction handler 420 in FIGS. 3 and 4A) obtains (e.g., receives, retrieves, or detects) one or more user requests or inputs provided by the user that are associated with selecting A/V content and/or virtual content for presentation. In some implementations, the request to view the virtual content corresponds to one of a voice command, a gestural command, a selection from a user interface (UI) menu, or the like. For example, the one or more user inputs correspond to a gestural input selecting virtual content from a UI menu detected via hand tracking, an eye gaze input selecting virtual content from the UI menu detected via eye tracking, a voice command selecting virtual content from the UI menu detected via a microphone, and/or the like. As one example, in FIG. 5A, the electronic device 120 detects a voice command 508 (e.g., "Play the virtual content associated with the cube.") from the user 150. In response to detecting the voice command 508 in FIG. 5A, the electronic device 120 phases the XR content 504 into the XR environment 128 in FIGS. 5B and 5C.

As represented by block 7-3, in response to detecting the request, the method 700 includes obtaining a second set of characteristics associated with the virtual content. In some implementations, the computing system or a component thereof (e.g., the content analyzer 430 in FIGS. 2 and 4A) obtains (e.g., receives, retrieves, or generates) the second set of characteristics associated with the virtual content. As one example, the content analyzer 430 parses and/or analyzes the virtual content to generate the second set of characteristics. In some implementations, the virtual content is pre-labeled with the second set of characteristics. In some implementations, the second set of characteristics include at least one of content characteristics, content dimensions, preferred viewing distance, focal/vanishing point, lighting characteristics, audio characteristics, mood, or the like for the virtual content or each theatrical scene within the virtual content. FIG. 4B, for example, shows an example data structure for the second set of characteristics 431 associated with the XR content 427.

As represented by block 7-4, in response to detecting the request, the method 700 includes generating a presentation region for the virtual content based at least in part on the first and second sets of characteristics. In some implementations, the computing system or a component thereof (e.g., the presentation region generator 444 in FIGS. 2 and 4A) generates a presentation region for the virtual content based at least in part on the first and second sets of characteristics. For example, see the sequence of instances illustrated in FIGS. 5A-5E and the description thereof above for further detail regarding the presentation regions 532 and 542.

In some implementations, the presentation region is generated based on a personal radius in addition to the first and second sets of characteristics. For example, the presentation region is constrained in size by a predefined personal radius (e.g., Y meters around the current location of the computing system and/or the user) or a "personal bubble" within which the physical environment is displayed and virtual content is not displayed to maintain an anchor to the real-world.

As represented by block 7-5, in response to detecting the request, the method 700 includes generating a transitional region provided to at least partially surround the presentation region based at least in part on the first and second sets of characteristics. As one example, the transitional region corresponds to a spherical (or a portion thereof) cut-out or a differently shaped volumetric region within which the virtual content is displayed. In some implementations, the computing system or a component thereof (e.g., the transitional region generator 446 in FIGS. 2 and 4A) generates a transitional region provided to at least partially surround the presentation region based at least in part on the first and second sets of characteristics. For example, see the sequence of instances illustrated in FIGS. 5A-5E and the description thereof above for further detail regarding the transitional regions 536 and 548.

In some implementations, the color, texture, lighting, brightness, contrast, visual effects, content, and/or the like associated with the transitional region are adaptive on a scene-by-scene basis. As one example, if a theatrical scene occurs during night-time, the transitional region may be associated with a starry sky and moonlight directed in the appropriate direction relative to the current camera pose. In some implementations, the width, size, shape, and/or other dimensions of the transitional region are also adaptive on a scene-by-scene basis.

In some implementations, in response to detecting the request, the method 700 includes modifying the virtual content based at least in part on the first and second sets of characteristics. In some implementations, the computing system or a component thereof (e.g., the content modifier 442 in FIGS. 2 and 4A) modifies the virtual content based at least in part on the first and second sets of characteristics. As one example, the content modifier 442 may change a color, a texture, a brightness, contrast, one or more dimensions, and/or the like of the virtual content or portions thereof. As another example, the content modifier 442 may change lighting characteristics, shadows, audio characteristics, and/or the like of the virtual content. As another example, the content modifier 442 may add virtual content portions to or remove virtual content portions of the virtual content. As one example, in FIG. 5C, the content modifier 442 adds the shadow 534 to the XR content 504.

In some implementations, while situated within the presentation region, the virtual content is larger than physically possible within the physical environment without the presentation region. As one example, the computing system may display the virtual content on a large format screen (e.g., an IMAX size screen) within the presentation region that would otherwise not fit within the physical environment. In FIG. 6, for example, the electronic device 120 presents an XR environment 128 including XR content 614 presented on a presentation surface 606 (e.g., a XR screen) within a presentation region 612, which is overlaid on the representation of the physical environment 105 within the XR environment 128. In FIG. 6, a north wall of the physical environment 105 is associated with a width value 602, and the presentation surface 606 is associated with a width value 604. In some implementations, the width value 604 is greater than the width value 602. As such, in one example, the presentation region 612 enables the user 150 to view the XR content 614 on the presentation surface 606 that is wider and/or larger than the physical dimensions of the physical environment 105. In other words, in some implementations, the presentation region 612 enables an artificially greater view distance and a greater presentation surface than is physically possible in the physical environment 105.

As represented by block 7-6, the method 700 includes concurrently presenting, via the display device, the virtual content within the presentation region and the transitional region at least partially surrounding the presentation region. In FIG. 5C, for example, the electronic device 120 presents the XR content 504 within a presentation region 532, which is overlaid on the representation of the physical environment 105 within the XR environment 128. Continuing with this example, in FIG. 5C, the electronic device 120 also presents a transitional region 536 surrounding the presentation region 532 within the XR environment 128. For example, the transitional region 536 visually blends the presentation region 532 with the representation of the physical environment 105 within the XR environment 128 in order to reduce visual discontinuities therebetween. As such, in some implementations, the transitional region blends a first appearance of the presentation region and a second appearance of the physical environment. In some implementations, the presentation region is overlaid on a view of the physical environment In some implementations, the display device corresponds to a transparent lens assembly, and wherein the presentation region and the virtual content therein are projected onto the transparent lens assembly. In some implementations, the display device corresponds to a near-eye system, and wherein presenting the first and second sets of media items includes compositing the presentation region and the virtual content therein with one or more images of a physical environment captured by an exterior-facing image sensor.

In some implementations, presenting the virtual content within the presentation region includes a phase-in animation for the virtual content by: presenting the virtual content overlaid on the physical environment without presenting the presentation region; and after a predefined time period, presenting the virtual content within the presentation region, wherein the presentation region is overlaid the view of the physical environment. In some implementations, the computing system first presents the virtual content overlaid on the physical environment and presents the virtual content within the presentation region a predefine time period later (e.g., X seconds). As one example, the initial presentation of the virtual content overlaid on the physical environment includes only presenting foreground characters and objects within the virtual content. As another example, the initial presentation of the virtual content overlaid on the physical environment includes presenting both foreground and background content associated with the virtual content.

FIGS. 5A-5C illustrates a sequence of instances 510, 520, and 530, respectively, in which the XR content 504 phases-into the XR environment 128. In FIG. 5A, the XR content 504 is first displayed within an XR cube 502 within the XR environment 128. In FIG. 5B, the XR content 504 is overlaid a view of the physical environment 105. In FIG. 5C, the XR content 504 is presented within the presentation region 532, which is, in turn, overlaid on the physical environment 105. As one example, in FIG. 5C, the presentation region 532 acts as a portal relative to the representation of the physical environment 105 and cuts away a portion of the representation of the physical environment 105.

In some implementations, the method 700 includes: detecting a change from a first camera pose to a second camera pose relative to the presentation region; and in response to detecting the change from the first camera pose to the second camera pose, updating the virtual content presented within the presentation region based on the second camera pose. For example, the change in camera pose corresponds to rotational and/or translation movement of the computing system and/or the user. As such in one example, the user may approach and/or walk around the presentation region and the virtual content (e.g., world locked XR content) presented therein.

In some implementations, in response to detecting the change from the first camera pose to the second camera pose, the method 700 includes updating an appearance of the transitional region based on the second camera pose. For example, the updated appearance of the transitional region includes adjusting lighting, shadows, etc. as the camera pose changes.

In some implementations, the method 700 includes: detecting a change from a first camera pose to a second camera pose relative to the presentation region; and in response to detecting the change from the first camera pose to the second camera pose relative to the presentation region, presenting second virtual content within the presentation region and the transitional region surrounding the presentation region. For example, in response to rotational movement such as 90- or 180-degree head turn, the computing system presents second virtual content associated with a different scene. Continuing with this example, the original scene will remain in its initial location if the user performs a reverse 90- or 180-degree head turn (e.g., world-locked XR content).

FIGS. 5C-5E illustrate a sequence of instances 530, 540, and 550, respectively, in which the XR environment 128 is updated based on a 90-degree change in camera pose. Between FIGS. 5C and 5D, the electronic device 120 detects a change in the camera pose whereby the FOV 111 of the exterior-facing image sensor of the electronic device 120 changes from facing northward relative to the physical environment 105 in FIG. 5C to facing westward relative to the physical environment 105 in FIG. 5D. In response to detecting the change in the camera pose between FIGS. 5C and 5D, the electronic device 120 leaves the XR content 504 (e.g., world-locked) in its location and presents second XR content 544 in FIG. 5D. Between FIGS. 5D and 5E, the electronic device 120 detects a change in the camera pose whereby the FOV 111 of the exterior-facing image sensor of the electronic device 120 changes from facing westward relative to the physical environment 105 in FIG. 5D to facing northward relative to the physical environment 105 in FIG. 5E. In response to detecting the change in the camera pose between FIGS. 5D and 5E, the electronic device 120 leaves the second XR content 544 (e.g., world-locked) in its location and presents the XR content 504 in FIG. 5E.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a computing system including non-transitory memory and one or more processors, wherein the computing system is communicatively coupled to a display device and one or more input devices:
obtaining a first set of characteristics associated with a physical environment;
detecting, via the one or more input devices, a request to cause presentation of virtual content;

in response to detecting the request:
  obtaining a second set of characteristics associated with the virtual content;
  generating a presentation region for the virtual content based at least in part on the first and second sets of characteristics; and
  generating a transitional region provided to at least partially surround the presentation region based at least in part on the first and second sets of characteristics; and
concurrently presenting, via the display device, the virtual content within the presentation region and the transitional region at least partially surrounding the presentation region.

2. The method of claim 1, wherein the first set of characteristics include at least one of one or more dimensions of the physical environment, current lighting characteristics associated with the physical environment, current audio characteristics associated with the physical environment, or acoustic characteristics associated with the physical environment.

3. The method of claim 1, wherein the second set of characteristics include at least one of content characteristics, content dimensions, preferred viewing distance, focal/vanishing point, lighting characteristics, audio characteristics, or mood for the virtual content or each theatrical scene within the virtual content.

4. The method of claim 1, wherein the request to view the virtual content corresponds to one of a voice command, a gestural command, or a selection from a user interface (UI) menu.

5. The method of claim 1, wherein the transitional region blends a first appearance of the presentation region and a second appearance of the physical environment.

6. The method of claim 1, wherein presenting the virtual content within the presentation region includes a phase-in animation for the virtual content by:
  presenting the virtual content overlaid on the physical environment without presenting the presentation region; and
  after a predefined time period, presenting the virtual content within the presentation region, wherein the presentation region is overlaid on a view of the physical environment.

7. The method of claim 1, wherein the presentation region is generated based on a personal radius in addition to the first and second sets of characteristics.

8. The method of claim 1, further comprising:
  in response to detecting the request, modifying the virtual content based at least in part on the first and second sets of characteristics.

9. The method of claim 8, wherein the virtual content is larger than an available display area within the physical environment without the presentation region.

10. The method of claim 1, further comprising:
  detecting a change from a first camera pose to a second camera pose relative to the presentation region; and
  in response to detecting the change from the first camera pose to the second camera pose, updating the virtual content presented within the presentation region based on the second camera pose.

11. The method of claim 10, further comprising:
  in response to detecting the change from the first camera pose to the second camera pose, updating an appearance of the transitional region based on the second camera pose.

12. The method of claim 1, further comprising:
  detecting a change from a first camera pose to a second camera pose relative to the presentation region; and
  in response to detecting the change from the first camera pose to the second camera pose relative to the presentation region, presenting second virtual content within the presentation region and the transitional region surrounding the presentation region.

13. The method of claim 1, wherein the presentation region is overlaid on a view of the physical environment.

14. A device comprising:
one or more processors;
a non-transitory memory;
an interface for communicating with a display device and one or more input devices; and
one or more programs stored in the non-transitory memory, which, when executed by the one or more processors, cause the device to:
  obtaining a first set of characteristics associated with a physical environment;
  detecting, via the one or more input devices, a request to cause presentation of virtual content;
  in response to detecting the request:
    obtaining a second set of characteristics associated with the virtual content;
    generating a presentation region for the virtual content based at least in part on the first and second sets of characteristics; and
    generating a transitional region provided to at least partially surround the presentation region based at least in part on the first and second sets of characteristics; and
  concurrently presenting, via the display device, the virtual content within the presentation region and the transitional region at least partially surrounding the presentation region.

15. The device of claim 14, wherein the first set of characteristics include at least one of one or more dimensions of the physical environment, current lighting characteristics associated with the physical environment, current audio characteristics associated with the physical environment, or acoustic characteristics associated with the physical environment.

16. The device of claim 14, wherein the second set of characteristics include at least one of content characteristics, content dimensions, preferred viewing distance, focal/vanishing point, lighting characteristics, audio characteristics, or mood for the virtual content or each theatrical scene within the virtual content.

17. The device of claim 14, wherein the transitional region blends a first appearance of the presentation region and a second appearance of the physical environment.

18. The device of claim 14, wherein presenting the virtual content within the presentation region includes a phase-in animation for the virtual content by:
  presenting the virtual content overlaid on the physical environment without presenting the presentation region; and
  after a predefined time period, presenting the virtual content within the presentation region, wherein the presentation region is overlaid on a view of the physical environment.

19. The device of claim 14, wherein the presentation region is generated based on a personal radius in addition to the first and second sets of characteristics.

20. A non-transitory memory storing one or more programs, which, when executed by one or more processors of a device with an interface for communicating with a display device and one or more input devices, cause the device to:
- obtaining a first set of characteristics associated with a physical environment;
- detecting, via the one or more input devices, a request to cause presentation of virtual content;
- in response to detecting the request:
  - obtaining a second set of characteristics associated with the virtual content;
    - generating a presentation region for the virtual content based at least in part on the first and second sets of characteristics; and
    - generating a transitional region provided to at least partially surround the presentation region based at least in part on the first and second sets of characteristics; and
  - concurrently presenting, via the display device, the virtual content within the presentation region and the transitional region at least partially surrounding the presentation region.

21. The non-transitory memory of claim 20, wherein the first set of characteristics include at least one of one or more dimensions of the physical environment, current lighting characteristics associated with the physical environment, current audio characteristics associated with the physical environment, or acoustic characteristics associated with the physical environment.

22. The non-transitory memory of claim 20, wherein the second set of characteristics include at least one of content characteristics, content dimensions, preferred viewing distance, focal/vanishing point, lighting characteristics, audio characteristics, or mood for the virtual content or each theatrical scene within the virtual content.

23. The non-transitory memory of claim 20, wherein the transitional region blends a first appearance of the presentation region and a second appearance of the physical environment.

24. The non-transitory memory of claim 20, wherein presenting the virtual content within the presentation region includes a phase-in animation for the virtual content by:
- presenting the virtual content overlaid on the physical environment without presenting the presentation region; and
- after a predefined time period, presenting the virtual content within the presentation region, wherein the presentation region is overlaid on a view of the physical environment.

25. The non-transitory memory of claim 20, wherein the presentation region is generated based on a personal radius in addition to the first and second sets of characteristics.

* * * * *